United States Patent [19]

Chang et al.

[11] Patent Number: 5,271,802
[45] Date of Patent: Dec. 21, 1993

[54] METHOD FOR MAKING A THIN FILM MAGNETIC HEAD HAVING A PROTECTIVE COATING

[75] Inventors: Henry C. Chang; Mao-Min Chen; Cheng T. Horng; Robert O. Schwenker, all of San Jose, Calif.

[73] Assignee: International Business Machines Corporation, Armonk, N.Y.

[21] Appl. No.: 987,509

[22] Filed: Dec. 7, 1992

Related U.S. Application Data

[62] Division of Ser. No. 634,834, Dec. 27, 1990, Pat. No. 5,175,658.

[51] Int. Cl.$^5$ ............................................. G11B 5/71
[52] U.S. Cl. .................................. 156/643; 156/655; 156/657; 29/603
[58] Field of Search ................. 156/643, 655, 657; 29/603

[56] References Cited

U.S. PATENT DOCUMENTS

| Re. 32,464 | 7/1987 | Aine | 428/622 |
|---|---|---|---|
| 3,573,768 | 4/1971 | Harris | 340/174.1 |
| 4,130,847 | 12/1978 | Head et al. | 360/122 |
| 4,647,494 | 3/1987 | Meyerson et al. | 428/216 |
| 4,740,853 | 4/1988 | Mukae et al. | 360/103 |
| 5,030,494 | 7/1991 | Ahlert et al. | 428/64 |
| 5,113,302 | 5/1992 | Shimizu et al. | 428/694 |
| 5,137,784 | 8/1992 | Suzuki et al. | 428/694 X |

FOREIGN PATENT DOCUMENTS

| 3714787 | 11/1988 | Fed. Rep. of Germany . |
|---|---|---|
| 58-150122 | 9/1983 | Japan . |
| WO88/06334 | 8/1988 | PCT Int'l Appl. . |

OTHER PUBLICATIONS

"Sliders for Magnetic Heads of Surface-Hardened Silicon with Integrated Electronic Components", Kaus, et al., IBM Tech. Discl. Bulletin, vol. 25 No. 7A, Dec., 1982.
"Silicon Nitride Protection for Magnetic Heads", F. d'Heurle, et al., IBM Tech. Discl. Bulletin, vol. 19 No. 1, Jun., 1976.

Primary Examiner—Thi Dang
Attorney, Agent, or Firm—Leslie G. Murray; James C. Wilson

[57] ABSTRACT

A method for making a magnetic head slider having a protective coating on the rails thereof, the protective coating containing a thin adhesion layer, a thin layer of amorphous hydrogenated carbon, and a thin masking layer. The protective coating is deposited on the air bearing surface of the slider after the thin film magnetic heads are lapped to a chosen dimension, but before the pattern of rails is produced on the air bearing surface. The protective coating protects the magnetic head during the rail fabrication process and in usage in a magnetic recording system protects the magnetic head from wear and corrosion damage.

12 Claims, 4 Drawing Sheets

METHOD FOR MAKING A THIN FILM MAGNETIC HEAD HAVING A PROTECTIVE COATING

This is a division of application Ser. No. 07/634,834, filed on Dec. 27, 1990, now U.S. Pat. No. 5,175,658.

FIELD OF THE INVENTION

This invention relates to magnetic heads, and in particular to thin film magnetic heads and to the method for making the thin film magnetic heads.

DESCRIPTION OF THE PRIOR ART

Thin film magnetic heads have been in use for many years, and these heads are conventionally formed on a substrate in a series of rows each having a plurality of heads. Once the heads are fabricated, the substrate is cut to form a row of heads in a side-by-side orientation, while still in a row format, the thin film magnetic heads are lapped to a predetermined throat height dimension which is very critical to head performance. Once the desired lapped throat height dimension is achieved, this should not be affected by subsequent processing of the head.

One of the subsequent steps in the processing of the heads is the production of a pattern of rails on the lapped surface to form an air bearing surface (ABS). The desired pattern of rails on the ABS has gotten progressively more complex in shape so that a dry processing technique such as an etching process is generally used. Protection of the thin film magnetic head during the etching process requires a protective coating which is generally thick and which is removed after completion of the etching process.

The row of magnetic heads is then separated into individual magnetic head sliders, and, in operation, the slider "flies" with the ABS and the attached thin film magnetic head a small uniform spacing, usually less than ten microinches, from the magnetic recording medium. In the normal operation of a magnetic disk recording system, the head sometimes comes into inadvertent contact with the magnetic recording medium.

In the prior art various protective layers were deposited on the magnetic head slider to protect the ABS from mechanical wear caused by contact between the head and magnetic recording medium during flying.

For example, U.S. Pat. No. 32,464 discloses a magnetic recording system in which a rigid magnetic recording disk has a protective layer of carbon to protect it from wear. The magnetic transducer is coated with carbon, preferably in the form of graphite, to provide a low friction wear resistant contacting surface with the recording medium. The thickness of the coating is between 2 and 10 microinches.

IBM TDB, December, 1982, p. 3173 describes a magnetic head slider having a protective layer of silicon carbide or diamond-like carbon. The thickness of the protective layer is within the range of 500 to 1000 angstroms.

IBM TDB, June, 1976, p. 351 describes a magnetic head having a protective layer of silicon nitride in layers of about 200 to 5000 angstroms.

Unexamined Japanese patent application, 58-150,122, published Sep. 6, 1983, describes a magnetic head having a thin film of a material having a lubricating effect on the surface of the head which faces the magnetic recording medium. A list of suitable materials is given which includes carbon, and the thickness of the film is within the range of 200 to 800 angstroms.

U.S. Pat. No. 4,130,847 describes a magnetic head slider having a protective coating over at least the magnetic head. The coating is produced in a recess within the slider body to a thickness as small as 10 microinches.

German patent application DE 3,714,787, published Nov. 24, 1988, describes a storage system in which the magnetic disk surface is coated with friction reducing carbon and the rails of the magnetic head slider are coated with a friction reducing lubricant comprising carbon. The thickness of the carbon is 10 to 1000 angstroms.

Patent application Ser. No. PCT/US88/00438, published Aug. 25, 1988, discloses a magnetic head slider in which a magnetic head is built within one of the side rails. A wear layer is provided over the slider which comprises a 50 angstroms thick chromium layer and a 200 angstrom thick carbon layer. Either of the two components of the wear layer can be omitted.

None of the references disclose a protective layer for a magnetic head slider which is effective to protect a thin film magnetic head not only during the normal operation of the magnetic head slider in a magnetic disk storage system but also in the fabrication process.

SUMMARY OF THE INVENTION

It is therefore the principal object to this invention to provide a thin protective coating on a magnetic head slider which protects the magnetic head not only during the normal operation of the magnetic head slider in a magnetic recording system but also in the fabrication process.

In accordance with the invention, a magnetic head slider is provided having leading and trailing ends and at least two rails on an air bearing surface. The rails have a protective coating on their surface comprising a thin adhesion layer, a thin layer of amorphous hydrogenated carbon, and a thin masking layer.

In a specific embodiment the adhesion layer comprises silicon about 10 to 50 angstroms thick, the masking layer comprises silicon about 50 angstroms thick, and the thickness of the protective coating is about 250 angstroms or less.

The method for making the magnetic head slider, after the air bearing surface is formed to provide a chosen magnetic head dimension, comprises the steps of depositing a protective coating on the air bearing surface, the protective coating comprising a thin adhesion layer, a thin layer of amorphous hydrogenated carbon, and a thin masking layer, forming a pattern of rails on the air bearing surface by removing material from the air bearing surface to a chosen depth in areas of the air bearing surface other than the rails, and retaining the protective coating on the rails during normal operation of the magnetic head slider in a magnetic recording system so that the magnetic head slider is protected from wear and corrosion damage.

DESCRIPTION OF THE PREFERRED EMBODIMENT

Figure 1:
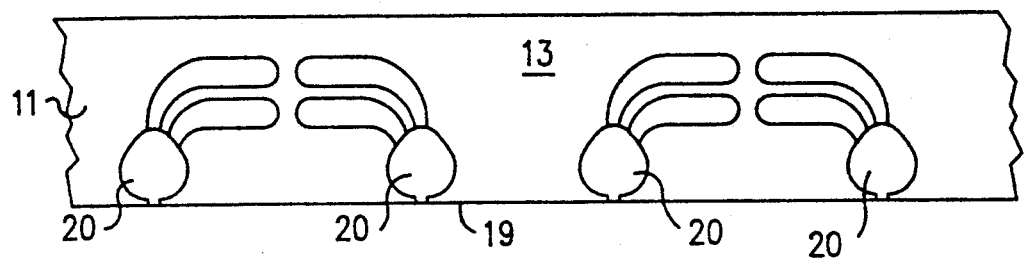
FIG. 1 is a plan view of a partial row of thin film magnetic heads.

The present invention relates to a magnetic recording system which includes a magnetic head slider. The slider supports a thin film magnetic read/write head, and the head is formed by depositing layers of magnetic material, electrically conductive material, and electrically insulating material to form the well known pole pieces and magnetic gap necessary for the transducing function with a magnetic coating on a magnetic recording medium. During fabrication, a plurality of thin film magnetic heads are deposited onto a wafer which is then cut to form rows of transducers with the transducers set in a side-by-side relationship. The thin film magnetic heads are lapped to a predetermined throat height dimension which is very critical to head performance. A pattern of rails is produced on the lapped surface to form an air bearing surface (ABS), and the row is separated into individual magnetic head sliders.

Each slider is mounted onto a suspension system which in turn is mounted onto an accessing system for locating the magnetic heads onto tracks formed by the magnetic heads when writing onto a rotating disk, magnetic for example. During normal operation the slider flies at a small spacing, in the range of a few microinches, over the magnetic recording medium.

It has been discovered that the prior art process of forming the ABS can produce a significant loss in yield in the manufacturing process due to corrosion damage to the sensitive head components. This has been found to be due in some cases to insufficient coverage of critical components during the etching operation and in other cases to damage to some head components during the removal of the masking layer used to protect the head during the etching process.

It has also been discovered that prior art protective layers deposited after ABS formation have not met the lifetime requirements of current thin film magnetic heads in operation. This degradation of head/slider life in operation has been discovered to be due, in part, to mechanical wear caused by the inadvertent contact between the head and magnetic recording medium during flying. In addition to the mechanical wear, the thin film magnetic heads contain a variety of materials that are attacked by the normal constituents of the atmosphere. Prolonged exposure of the head to the atmosphere can result in degradation of the head performance due to oxidation and resulting in corrosion of the head materials.

It was unexpectedly observed, according to the present invention, that a protective coating comprising a thin adhesion layer, a thin layer of amorophous hydrogenated carbon, and a masking layer is effective to protect the thin film magnetic head from damage not only in the processing to form the pattern of rails on the ABS, but also during normal operation of the head in a magnetic disk file. This was unexpected since in prior art processes, the protective coating used during processing was made very thick since it was progressively eroded during the etching process for forming the ABS. On the other hand, the total thickness of the protective layer on the slider during operation is constrained to a very thin dimension since its thickness adds directly to the spacing between the thin film magnetic head and the magnetic recording medium. In a specific embodiment a thickness of amorphous hydrogenated carbon as little as 50 angstroms thick was shown to produce significant improvement to both manufacturing yield and lifetime of the head in operation.

Referring to FIG. 1, there is shown a view of a partial row 11 having a plurality of thin film magnetic heads 20. The row 11 is lapped on surface 19 so that each of the thin film magnetic heads 20 has a chosen throat height. A pattern of rails is produced on surface 19 to form an air bearing surface (ABS), and the row is then separated into individual magnetic head sliders 10.

Figure 2:
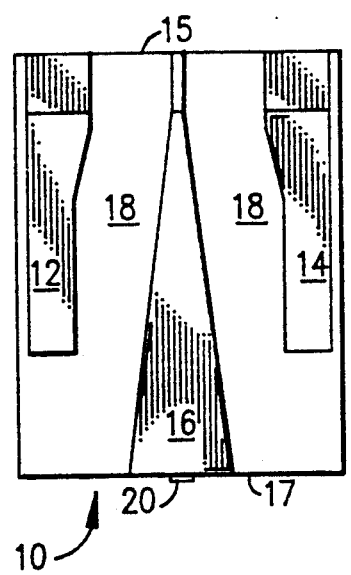
FIG. 2 is a bottom plan view of a specific embodiment of a magnetic head slider.

The pattern of rails may be as shown in FIG. 2 in which a pair of outside rails 12, 14 is produced along with a center rail 16. The side rails extend from the leading end 15 of the slider 10 part way to the trailing end 17, while the center rail extends from the leading end 15 to the trailing end 17. The thin film magnetic head 20 is located at the trailing end of the center rail 16.

Figure 3:
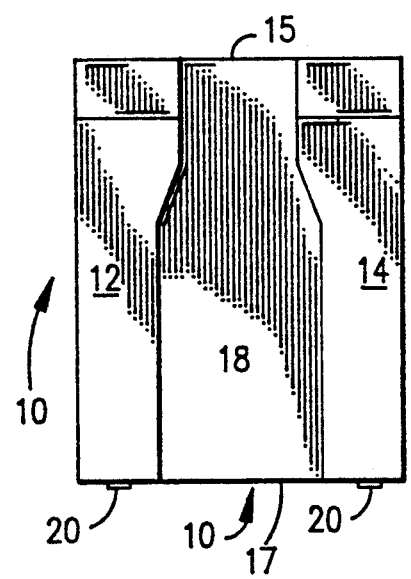
FIG. 3 is a bottom plan view of an alternate embodiment of a magnetic head slider.

The pattern of rails may also be as shown in FIG. 3, and this embodiment corresponds to the arrangement shown in row 11 of FIG. 1. In this case the outside rails 12, 14 extend from the leading end 15 of the slider 10 to the trailing end 17. The thin film magnetic heads 20 are located at the trailing end 17 of the side rails 12, 14.

The rail pattern produced in individual sliders 10 is at the same level on the ABS 19 as the lapped pole pieces of the thin film magnetic heads 20, and the remainder is a recessed area which is recessed from the ABS 19 by a distance chosen to produce a combined pressure profile with a moving magnetic recording medium so that the slider 10 flies at the chosen flying height or spacing over the magnetic recording medium.

According to the present invention, at a time after the heads are lapped to the selected throat height and before the rail pattern is produced on -he ABS, a protective coating is produced over the ABS. This protective coating protects the thin film magnetic heads in three ways. The protective coating is effective to protect the thin film magnetic head during the processing of the head/slider to form the pattern of rails on the ABS. The protective coating is also effective, during normal operation of the head in a magnetic disk file, for example, to protect the head and the ABS from mechanical wear caused by inadvertent contact between the head/slider and the magnetic recording medium during flying. In addition to mechanical wear, the protective coating also is effective to protect the variety of materials in the magnetic head that are attached by the normal constituents of the atmosphere from oxidation and corrosion in normal operation of the system.

The protective coating 22 (FIGS. 5 and 6) comprises at least three layers, the first layer being a suitable adhesion layer 24, the second layer being a layer of amorphous hydrogenated carbon 26, and the third layer being a suitable masking layer 28. In a specific embodiment the adhesion layer 24 is silicon, the masking layer 28 is a compound of silicon, and the total thickness of the protective coating 22 is about 250 angstroms.

The process for making the magnetic head slider, according to the present invention, will be described with reference to FIG. 4. The process starts with either a single slider 10, or preferably a row 11 comprising a plurality of sliders in a side-by-side relationship. The thin film magnetic heads 20 are fabricated on a first surface 21 of the row 11, and first surface 21 is at substantially ninety degrees to the ABS 19. ABS 19 is lapped until the thin film magnetic heads reach a predetermined throat height. The lapping can be by any suitable technique such as that described in commonly assigned U.S. Pat. No. 4,912,883, for example. Alternatively, should the thin film magnetic heads 20 include a magnetoresistive (MR) read transducer, the lapping can be as described in commonly assigned U.S. Pat. No. 4,914,868 in which the ABS is lapped until the MR read transducer reaches a chosen MR element height.

Figure 4A:
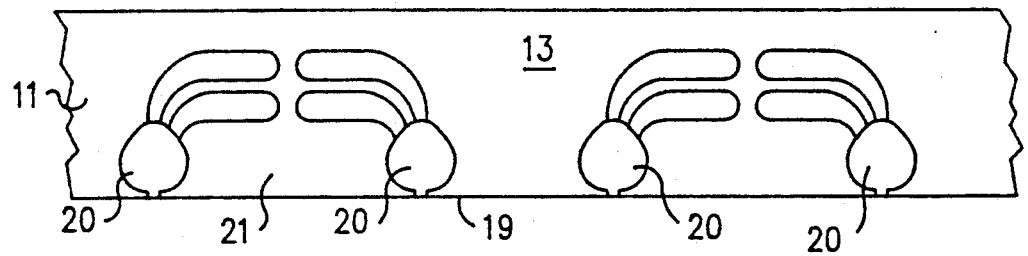
FIGS. 4A–D comprise views of a partial row of thin film magnetic heads showing successive steps in the process for making magnetic head slider according to the present invention.
Figure 4B:
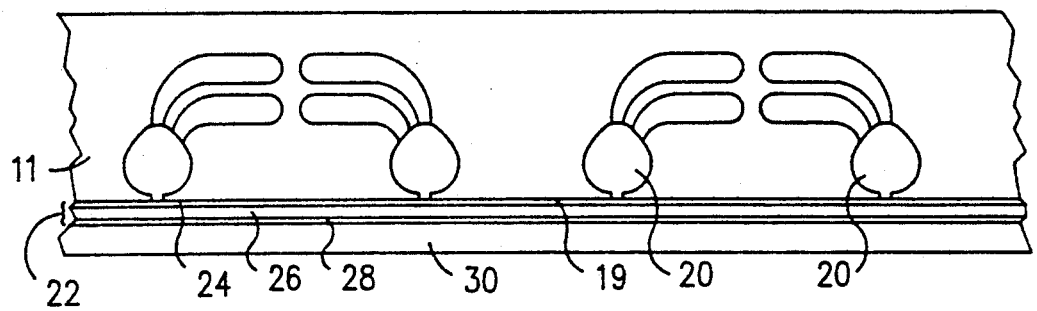

The lapped row of thin film magnetic heads is shown in FIG. 4A. The protective coating 22 is then deposited in three layers comprising an adhesion layer 24, a layer of amorphous hydrogenated carbon 26, and a masking layer 28. In a specific embodiment, adhesion layer 24 comprises a deposited layer of amorphous silicon. Typically, the silicon is deposited to a thickness of about 10–50 angstroms, although a possible range is from a monolayer to about 500 angstroms. However, from the standpoint of limiting the increase in spacing between the magnetic head and magnetic recording medium, the thinner layer (less than 50 angstroms) of silicon is preferred.

The layer of hydrogenated amorphous carbon 26 is deposited to a thickness of about 50–1000 angstroms. A layer of hydrogenated amorphous carbon 26 as little as 50 angstroms thick has been shown to provide a significant improvement in both wear and corrosion rates. However, a thicker layer is preferable since it provides increased protection, so the thickness is chosen based on the permissible increase in spacing between the magnetic head and the magnetic recording medium.

The layers of the protective coating 22 can be deposited by any suitable technique such as sputtering for example. Either DC magnetron sputtering or RF magnetron sputtering can be used. In a specific embodiment the adhesion layer 24 comprises silicon in a thickness of about 10 to about 50 angstroms.

The deposition parameters of the amorphous hydrogenated carbon layer 26 determine the characteristics of the layer since hydrogen content, density, hardness, and optical density are a function of the sputtering power, the per cent hydrogen in the argon carrier gas and the pressure.

Figure 7:
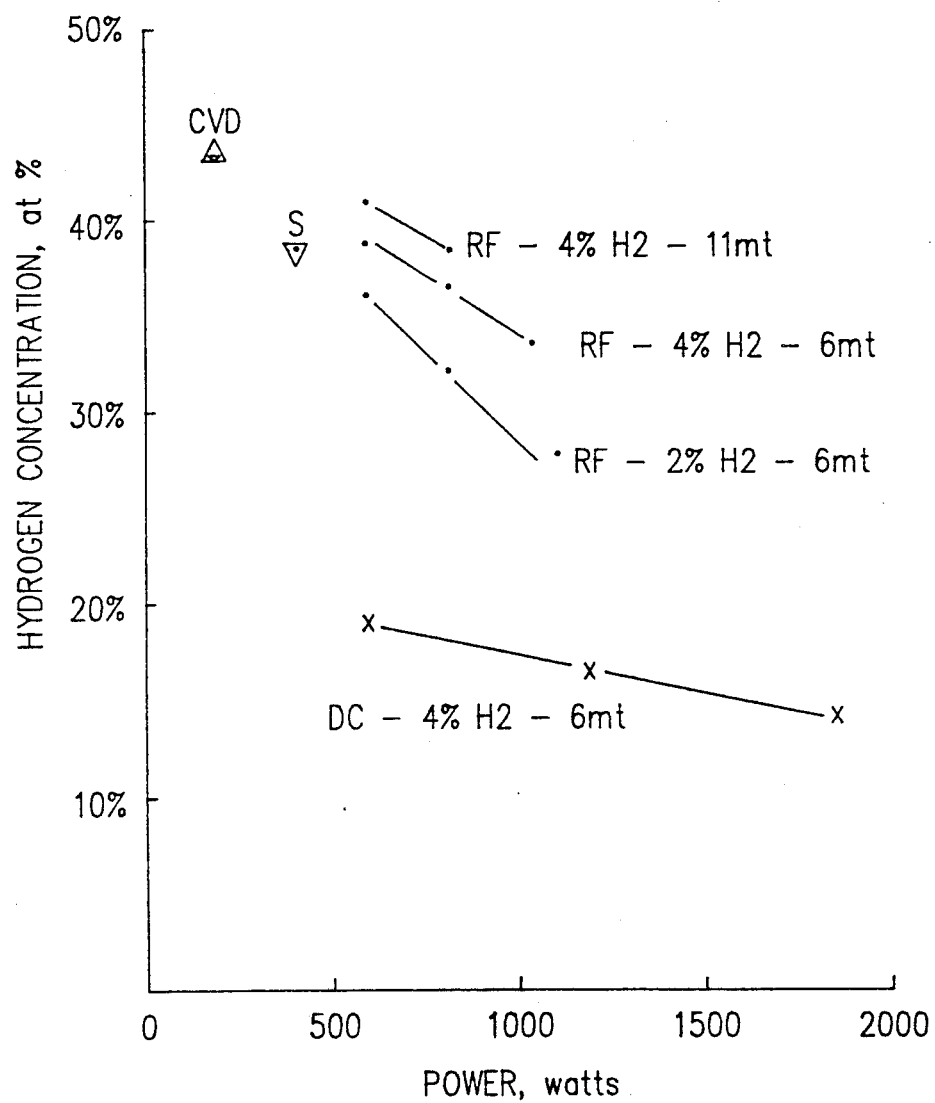
FIG. 7 is a graph showing the hydrogen concentration in the amorphous hydrogenated carbon layer as a function of sputtering power.

FIG. 7 shows the hydrogen concentration in the amorphous hydrogenated carbon layer 26 as a function of sputtering power, percent hydrogen, and pressure. Note that, by the use of DC magnetron sputtering, a hydrogen concentration within the range of 15 to 19 per cent can be achieved for that specific embodiment. Note that the three examples given for RF magnetron sputtering produce a hydrogen concentration within the range of about 28–40 percent. Note that in a specific embodiment of chemical vapor deposition (CVD), the hydrogen concentration was about 43 per cent, and for a further specific embodiment of a sputtering system S the hydrogen concentration was about 38 per cent.

For a specific embodiment, RF magnetron sputtering was chosen for deposition of the amorphous hydrogenated carbon layer since a hydrogen concentration within the range of 28 to 40 per cent produced the best combination of characteristics for density, hardness, optical density, resistivity, breakdown voltage and the best corrosion protection of any of the other deposition techniques that were tried.

A thick layer of a patternable material 30 is then deposited over the protective coating 22. Patternable material 30 comprises photoresist material in a preferred embodiment. The photoresist material is exposed through an appropriate mask (not shown) in a negative pattern of the chosen rail configuration, developed and removed in the exposed areas. The remaining photoresist material serves as a mask for forming the chosen rail pattern on ABS 19.

Figure 4C:
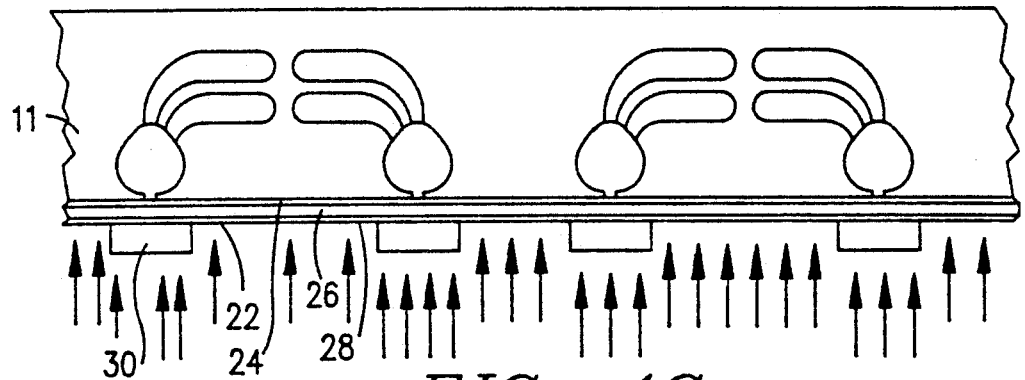
Figure 4D:
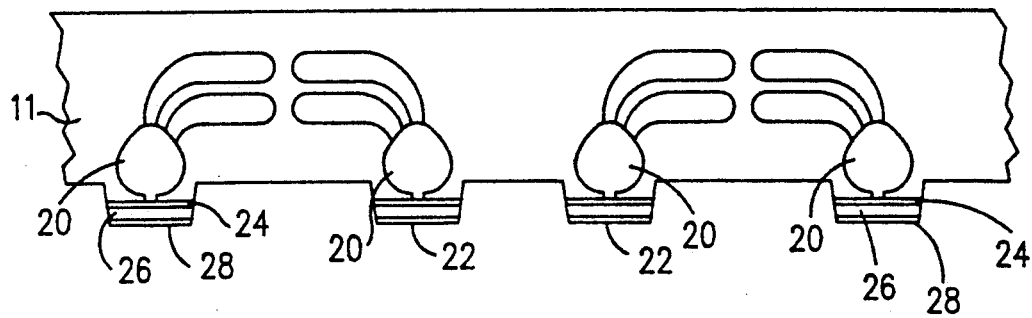

The masked row 11 is then subjected to a suitable material removal process such as by etching by sputter etching, by reactive ion etching, by ion milling, or laser etching, for example, as depicted by the arrows in FIG. 4C. During the etching process, the material comprising the unmasked portion of protective coating 22 is removed first, and the underlying area of the substrate 13 is then removed to a depth which is chosen to provide the desired flying characteristics for the slider 10. The remainder of the photoresist mask 30 is then removed by a suitable solvent, for example.

The material forming masking layer 28 is chosen so that it does not react with the material chosen for removing the layer of patternable material 30. In a specific embodiment, masking layer 28 is formed of silicon. The silicon does not react with the solvent chosen to remove the remainder of photoresist layer 30. The protective coating 22 is then subjected to an oxygen plasma etching treatment and at least the exposed surface of the silicon masking layer 28 reacts with the oxygen during the oxygen plasma etching so that a silicon compound $SiO_x$ is formed. The compound is referred to as $SiO_x$ since analysis has shown that it is not strictly $SiO_2$, so some other oxides are formed with silicon and the resulting $SiO_x$ layer provides an excellent protective layer since it is tough and is not reactive with any of the normal components of the atmosphere. The $SiO_x$ layer also serves as an etch stop so that none of the underlying layers of protective coating 22 are affected during the oxygen plasma etching operation.

Figure 5:
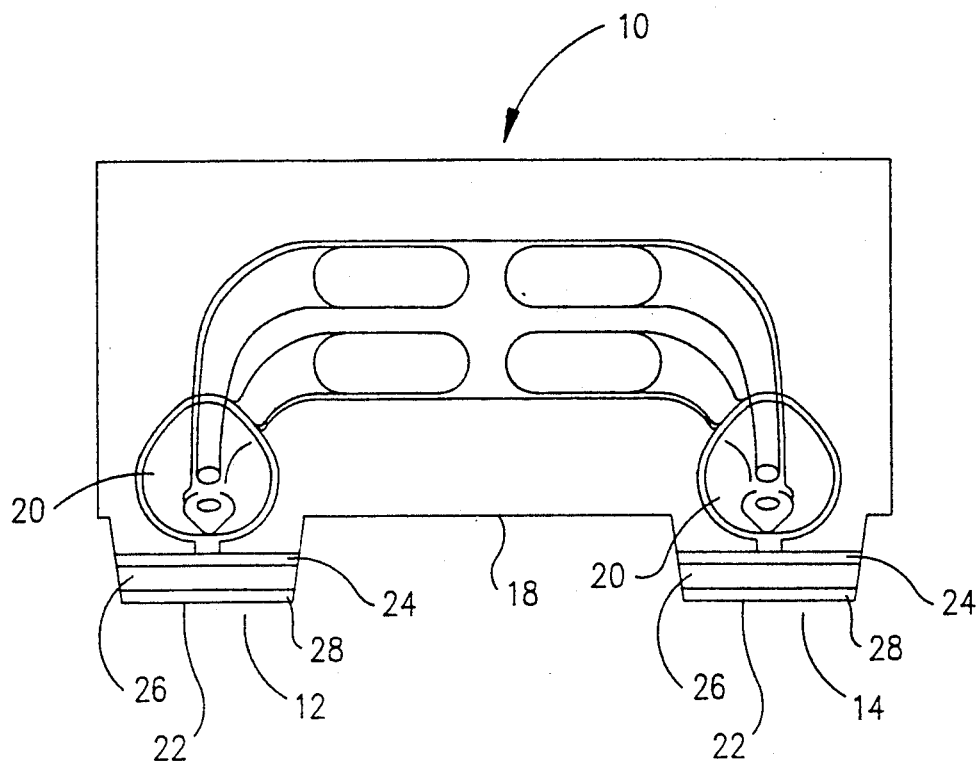
FIG. 5 is a plan view of the trailing end of a specific embodiment of a magnetic head slider according to the present invention.
Figure 6:
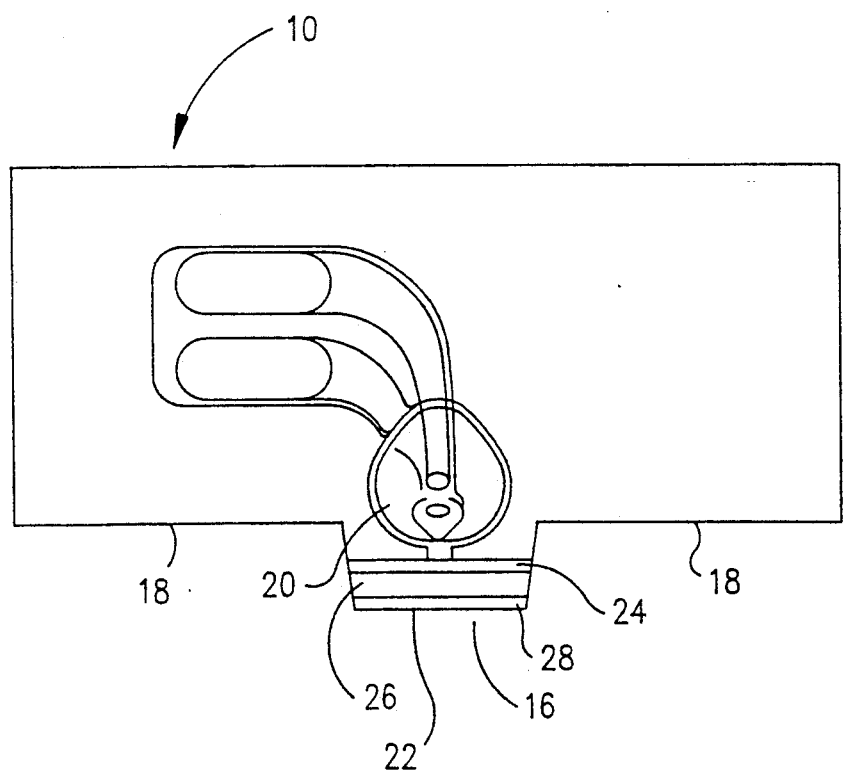
FIG. 6 is a plan view of the trailing end of an alternate embodiment of magnetic head slider according to the present invention.

The remaining part of the protective coating 22 covers the rails of the sliders 10 and has protected the slider during the slider rail fabrication process. The sliders 10 in the row 11 are then parted to form individual sliders as shown in FIGS. 5 and 6. The protective coating also protects the thin film magnetic head 20 and the ABS from wear and corrosion damage during normal operation of the slider 10 in a magnetic recording system.

In another embodiment of the present invention, the protective coating 22 comprises four layers. The four layers comprise a thin adhesion layer, a thin amorphous hydrogenated carbon layer 26, a thin masking layer 28, and a thick amorphous hydrogenated carbon overlayer 32. The process for this embodiment has the same steps as before, and the thick carbon overlayer 32 provides extra protection against damage to the thin film magnetic head during the etching operation. However, during the oxygen plasma etching operation, the thick carbon overlayer 32 reacts with the oxygen to form CO and $CO_2$ and therefore this overlayer 32 is removed. The resulting structure on the slider 10 is substantially the same as that described above since the reaction between the silicon etch stop layer 28 and the oxygen is substantially the same.

A magnetic head slider has been disclosed having a thin protective coating thereon which protects the magnetic head from damage not only during fabrication but also in normal operation in a magnetic disk file, for example, and the protective coating comprises a thin adhesion layer and a thin layer cf amorphous hydrogenated carbon. This structure is in contrast to prior art techniques in which a thick protective coating was used during fabrication and then removed, and a thin protective coating was deposited after fabrication of the slider to serve as a protective coating during usage. The present invention produces greater manufacturing yields and a longer lifetime in operation in a magnetic recording system.

While the invention has been particularly shown and described with reference to a preferred embodiment thereof, it will be understood by those skilled in the art that various other changes in the form and details may be made therein without departing from the spirit and scope of the invention.

We claim:

1. A method for making a magnetic head slider for supporting a magnetic head, said slider having an air bearing surface formed to provide a chosen magnetic head dimension, said method comprising the steps of:
   depositing a protective coating on said air bearing surface cf said slider, said protective coating comprising a thin adhesion layer, a thin layer of amorphous, hydrogenated carbon. and a thin masking layer;
   forming a pattern of at least one rail on said air bearing surface by removing material from said air bearing surface to a chosen depth in areas of said air bearing surface other than said at least one rail;
   changing the characteristics of at least the surface of said masking layer; and
   retaining said protective coating on said at least one rail so that, during normal operation of said slider in a magnetic recording system, the protective coating serves to protect the magnetic head and the air bearing surface from wear and corrosion damage.

2. The method for making a magnetic head slider according to claim 1 wherein said step of forming a pattern of at least one rail is produced by an etching process.

3. The method for making a magnetic head slider according to claim 2 wherein said etching process comprises reactive ion etching.

4. The method for making a magnetic head slider according to claim 1 wherein said adhesion layer comprises silicon.

5. The method for making a magnetic head slider according to claim 4 wherein the thickness of said adhesion layer is about 10-50 angstroms.

6. The method for making a magnetic head slider according to claim 5 wherein the thickness of said protective coating is about 250 angstroms or less.

7. A method for making a magnetic head slider for supporting a magnetic head, said slider having an air bearing surface formed to provide a chosen magnetic head dimension, said method comprising the stops of:
   depositing a protective coating on said air bearing surface of said slider, said protective coating comprising a thin adhesion layer, a thin layer of amorphous hydrogenated carbon, a thin masking layer, and a thick layer of amorphous hydrogenated carbon;
   forming a pattern of at least one rail on said air bearing surface by removing material from said air bearing surface to a chosen depth areas of said air bearing surface other than said at least one rail;
   subjecting the patterned slider to an oxygen etching process to remove said thick layer of amorphous hydrogenated carbon and change the characteristics of at least the surface cf said masking layer; and
   retaining said protective coating an said at least one rail so that, during normal operation of said slider in a magnetic recording system, the protective coating serves to protect the magnetic head and the air bearing surface from wear and corrosion damage.

8. The method for making a magnetic head slider according to claim 7 wherein said step of forming a pattern of at least one rail is produced by an etching process.

9. The method for making a magnetic head slider according to claim 8 wherein said etching process comprises reactive ion etching:

10. The method for making a magnetic head slider according to claim 7 wherein said adhesion layer comprises silicon.

11. The method for making a magnetic head slider according to claim 10 where in the thickness of said adhesion layer is about 10-50 angstroms.

12. The method for making a magnetic head slider according to claim 7 wherein the thickness of said protective coating after said oxygen etching step is about 250 angstroms or less.

* * * * *

UNITED STATES PATENT AND TRADEMARK OFFICE
CERTIFICATE OF CORRECTION

PATENT NO. : 5,271,802
DATED : December 21, 1993
INVENTOR(S) : Chang et al.

It is certified that error appears in the above-indentified patent and that said Letters Patent is hereby corrected as shown below:

In The Claims

Column 8, line 28, delete "an", insert -- on --.

Signed and Sealed this

Sixteenth Day of May, 1995

Attest:

BRUCE LEHMAN

Attesting Officer

Commissioner of Patents and Trademarks